United States Patent
Pacala

(10) Patent No.: US 6,924,630 B1
(45) Date of Patent: Aug. 2, 2005

(54) BUCK-BOOST POWER FACTORY CORRECTION CIRCUIT

(75) Inventor: Viorel Mark Pacala, Mount Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/770,816

(22) Filed: Feb. 3, 2004

(51) Int. Cl.$^7$ .............................................. G05F 1/613
(52) U.S. Cl. ..................... 323/224; 323/222; 323/282; 323/207
(58) Field of Search .......................... 323/222, 224, 323/207, 282, 901, 908

(56) References Cited

U.S. PATENT DOCUMENTS 4,323,845 A * 4/1982 Leach ...................... 323/224
5,642,267 A * 6/1997 Brkovic et al. ............... 363/16

* cited by examiner

Primary Examiner—Shawn Riley
(74) Attorney, Agent, or Firm—Duane Morris LLP

(57) ABSTRACT

A buck-boost switching converter includes a soft-switching circuit coupled across the boost switch, controlled to establish a short-circuit across the boost switch prior to turn-on of the boost switch. The converter also includes a second soft-switching circuit including a third switch and a saturable inductor coupled across the buck switch. The third switch is rendered conductive sufficiently before the buck switch so that a half-cycle of resonance can occur between the saturable inductor and the buck switch.

2 Claims, 4 Drawing Sheets

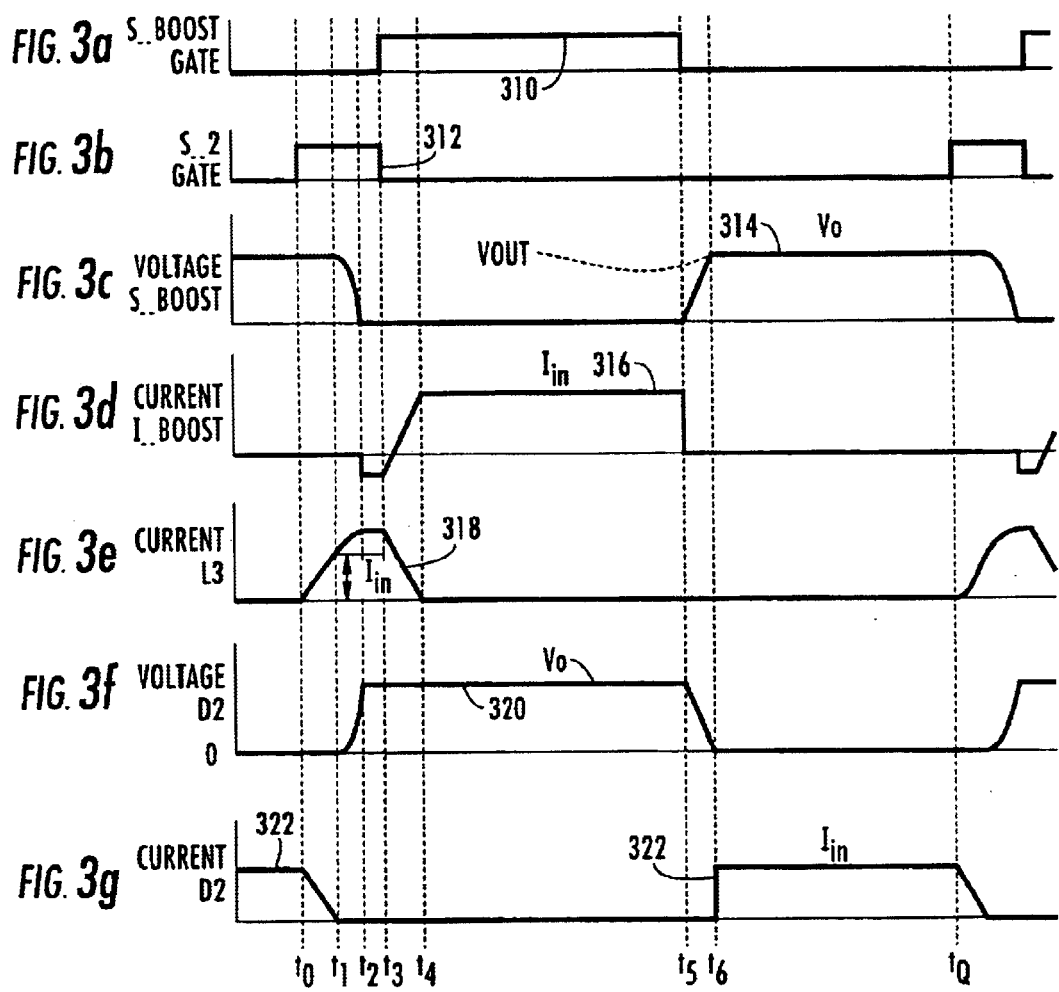

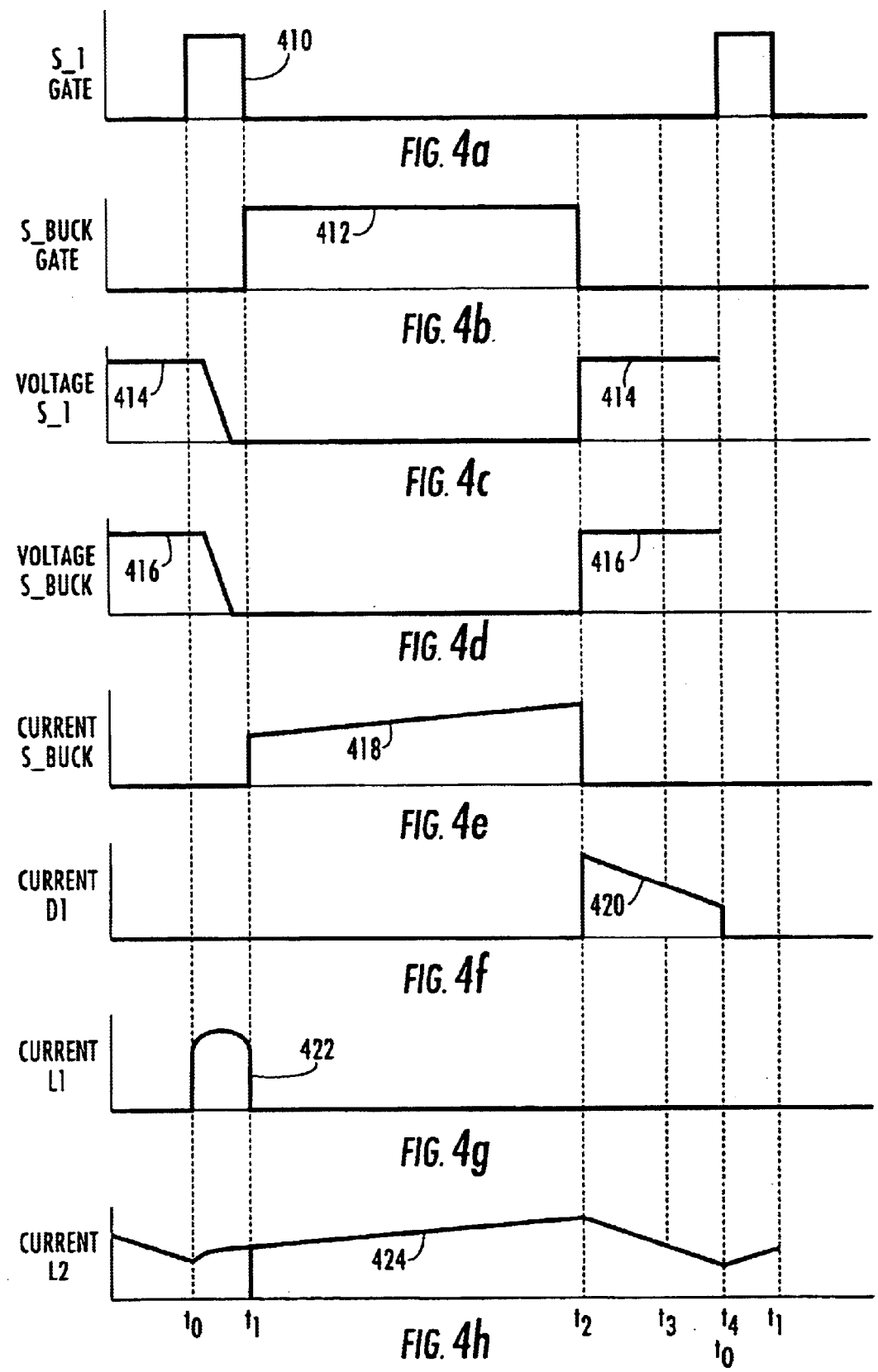

BUCK-BOOST POWER FACTORY CORRECTION CIRCUIT

FIELD OF THE INVENTION

This invention relates to switching power supplies, and more particularly to buck-boost power supplies in which at least the buck switch soft switches.

BACKGROUND OF THE INVENTION

Modern switching power supplies are used for powering a wide variety of solid-state equipment, such as computers, televisions, and communication equipments. The ability to perform power switching at high frequencies allows the use of miniaturized inductors, which in turn tends to reduce the weight and volume of the power supply. A limiting factor in the miniaturization of such power supplies is the heat generated during the switching of the power switches of the supply.

When large amounts of power are to be supplied to an equipment, the power drain from the AC power lines or mains can be large. It is very desirable to reduce the load on the AC power lines by minimizing the current required to deliver a given amount of power. It is well known that the current in the AC power lines may not be in-phase with the applied voltage, as a result of reactive load elements. The out-of-phase condition, in turn, results in the flow of currents having a magnitude greater than would be the case for an in-phase condition. These larger currents, in turn, undesirably tend to stress the power transmission system. Thus, it is desirable to correct the power factor of the input power to a power supply.

In some cases, miniaturization of a power supply can be aided by operation of an alternating-voltage to direct-voltage (AC-to-DC) converter from rectified alternating (pulsating direct) voltage directly from the power mains, without significant capacitive filtering. Such operation reduces the required size of a direct voltage storage capacitor which might be associated with the rectifier. In practice, some minimal amount of filtration may be required, without changing the essence of the rectified voltage from pulsating direct voltage to direct voltage. Plot 22 of FIG. 2 illustrates a pulsating direct voltage V_in which exhibits essentially zero-voltage nulls at times indicated as ta, tb, tc, and td. Pulsating direct voltage differs from alternating voltage in that the voltage direction remains the same during all half-cycles of operation, rather than reversing polarity each half-cycle of operation.

When a switching power supply operates from pulsating direct voltage, the input voltage may at times be near zero amplitude, and may at other times, namely during the peak of a voltage half-cycle, have a significant value. It may often occur that the desired direct output voltage, (V_out) 23 of FIG. 2, may be greater than the minimum pulsating direct input voltage, as for example near time ta, between times t2 and t3, between times t4 and t5, and near time td, and at other times, namely in the time intervals t1 to t2, t3 to t4, and t5 to t6, the value of the pulsating direct voltage may exceed the desired output voltage. Consequently, there is a need for a switching power supply capable of operation in a "boost" mode in which the input voltage is "boosted" to the desired direct output voltage level, and in a "buck" mode in which the direct output voltage is less than the value of the pulsating direct voltage.

Improved or alternative switching power supplies are desired.

SUMMARY OF THE INVENTION

A buck-boost power factor correcting supply according to an aspect of the invention is for generating a direct output voltage for energizing a load, and for operation from full-wave rectified line voltage which takes on voltage values both greater than and less than the direct output voltage. The supply comprises a first inductor including first and second terminals. A buck switch is connected to a terminal of the source of full-wave rectified line voltage and to the first terminal of the first inductor. An output capacitance including a first terminal is connected to a reference potential and also includes a second terminal at which the direct output voltage is generated for use by the load. A free-wheeling unidirectional current conducting means is provided. The free-wheeling unidirectional current conducting means includes a first terminal connected to the reference potential and a second terminal connected to the first terminal of the first inductor, for providing a path for the flow of current through the first inductor during at least some intervals during which the buck switch is nonconductive. A blocking unidirectional current conducting means includes a first terminal connected to the second terminal of the first inductor and a second terminal connected to the second terminal of the output capacitance, and is poled for blocking discharge of the output capacitance in a direction other than to the load. A boost switch is connected to the second terminal of the first inductor and to the reference potential, for, during at least some intervals in which the buck switch is conductive, connecting the second terminal of the first inductor to the reference potential, for thereby increasing the energy stored in the first inductor. A first soft-switching circuit includes the serial combination of a first soft-switching switch and a saturable second inductor. The first soft-switching circuit is coupled in parallel with the boost switch. A second soft-switching circuit includes the serial combination of a second soft-switching switch and a saturable third inductor. The second soft-switching circuit is connected in parallel with the buck switch. A control means is connected to the buck switch, the boost switch, and to the first and second soft-switching switches, for, (a) when the full-wave rectified line voltage is less than the direct output voltage, maintaining the buck switch conductive, and from time to time rendering the boost switch alternately conductive and nonconductive, and, prior to the transitions of the boost switch from the nonconductive to the conductive state, rendering the first soft switching switch conductive, whereby the first soft switching circuit reduces the voltage appearing across the boost switch at the time the boost switch is rendered conductive by comparison with the voltage appearing across the boost switch in the absence of the first soft switching circuit, and (b) when the full-wave rectified line voltage is greater than the direct output voltage, maintaining the boost switch and the first soft switching switch nonconductive, and from time to time rendering the buck switch alternately conductive and nonconductive, and, prior to transitions of the buck switch from the nonconductive to the conductive state, rendering the second soft switching switch conductive, whereby the second soft switching circuit reduces the voltage appearing across the buck switch at the time the buck switch is rendered conductive by comparison with the voltage appearing across the buck switch in the absence of the second soft switching circuit.

In a particularly advantageous embodiment, the buck switch is a solid-state switch having inherent capacitance, and the second soft-switching switch is rendered conductive at a time sufficiently prior to the rendering conductive of the buck switch to allow one-half cycle of resonance between the saturable inductor of the second soft-switching circuit and the capacitance of the buck switch.

BRIEF DESCRIPTION OF THE DRAWING

FIG. 3a plots the control or gate voltage of the boost switch of FIG. 1 over an operating cycle, FIG. 3b plots the control voltage of the soft switching switch associated with the boost switch, FIG. 3c plots the boost voltage, FIG. 3d plots the sum of the current in the boost switch and the associated soft switching circuit of FIG. 1, FIG. 3e plots the current in the soft switching inductor FIG. 3b, FIG. 3f plots the voltage across a diode of FIG. 1, and FIG. 3g plots current in the diode of FIG. 3f, all over a boost operating cycle, as taken from a prior-art application note; and FIG. 4a plots the control signal for a soft switching circuit associated with the buck switch of FIG. 1, FIG. 4b plots the control signal for the buck switch of FIG. 1, FIG. 4c plots the voltage across the soft switching switch associated with the boost switch, FIG. 4d plots the voltage across the buck switch, FIG. 4e plots the current in the buck switch, FIG. 4f plots the current in a unidirectional current conductor of FIG. 1, FIG. 4g plots the current in a saturable inductor of the soft switching circuit associated with the buck switch, and FIG. 4h plots the current in the main inductor, all over a cycle of buck mode operation.

DESCRIPTION OF THE INVENTION

Figure 1:
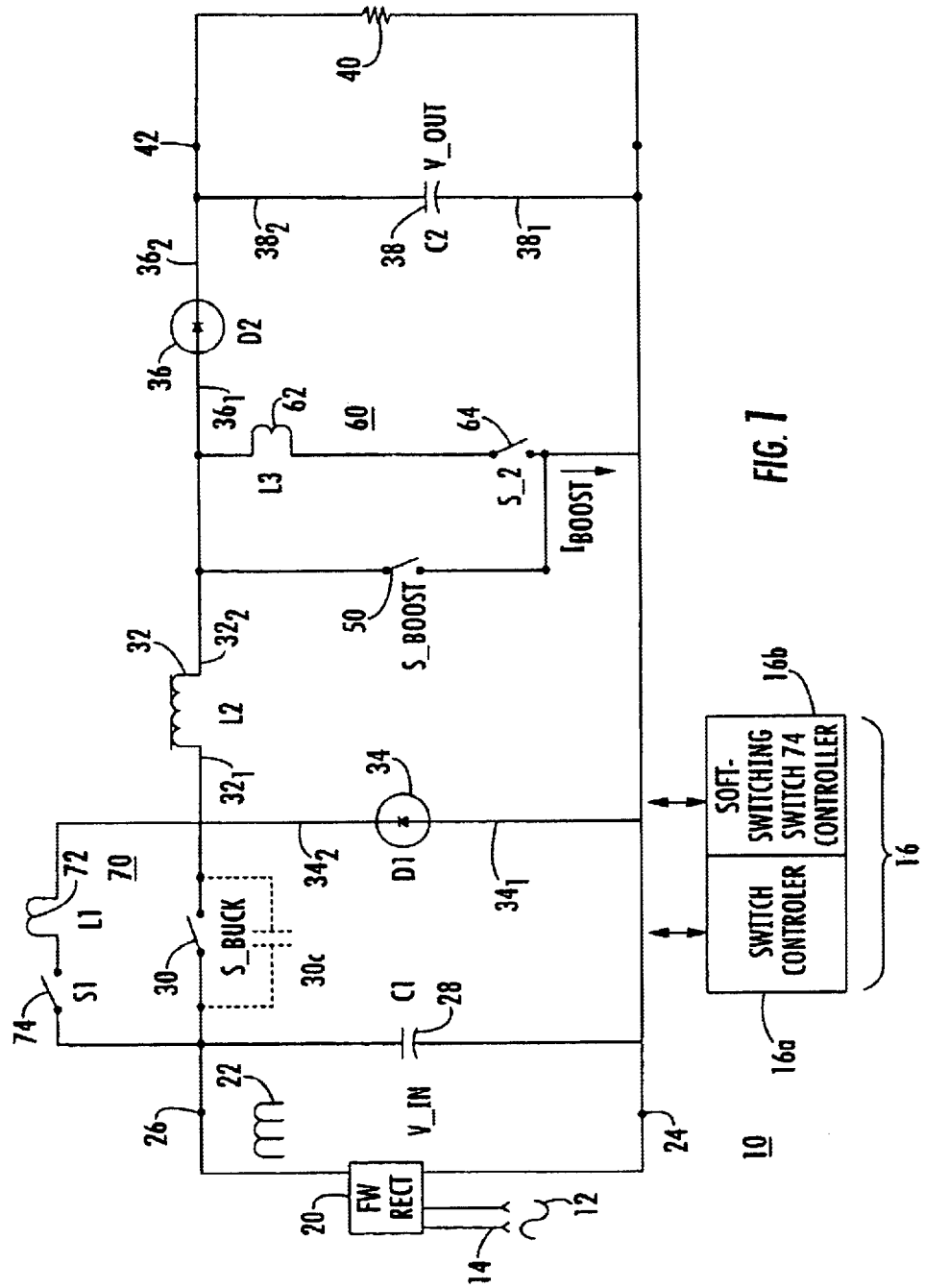
FIG. 1 is a simplified diagram in block and schematic form, illustrating a switching buck-boost AC-to-DC power converter according to an aspect of the invention.

FIG. 1 is a simplified diagram in block and schematic form of a switching buck-boost power supply designated generally as 10, for operation from alternating power line mains voltage. In FIG. 1, the alternating power line mains voltage 12 is applied by way of terminals 14 to a full wave rectifier (FW Rect) 20. Rectifier 20 rectifies or "makes straight" the applied alternating mains voltage, to thereby produce the pulsating direct voltage (V_in) illustrated as 22 in FIG. 2. The pulsating direct voltage is produced "between" terminals 24 and 26, where terminal 24 is taken to be a reference terminal, which may be "ground." Those skilled in the art know that the term "between" in electrical parlance is distinct from ordinary usage in a mechanical context, and relates to the ending points of the electric field lines associated with the voltage, and not to any physical position. The pulsating direct voltage 22 is slightly filtered by a capacitor (C1) 28, without changing the essence of the applied voltage as pulsating direct voltage.

Power supply 10 of FIG. 1 includes a buck switch S_buck 30 illustrated by a conventional mechanical switch symbol. Those skilled in the art know that such a representation is simply a convention, and that mechanical switches are not actually used for high-frequency switching in modern equipment, but instead that solid-state switches are used. The state of buck switch 30, and all the other switches of power supply 10, is controlled by signals produced by a switch controller illustrated as a block 16, which includes a prior-art controller 16a and a controller 16b according to an aspect of the invention. One specific type of prior-art controller is type UC3855A/B manufactured by Unitrode Corporation of 7 Continental Blvd, Merrimack, N.H. 03054. During those intervals in which buck switch 30 is ON or conductive, the voltage applied at input terminal 26 is felt at a first terminal 32, of an inductor (L2) 32. A unidirectional current conducting device (D2) illustrated as a diode or rectifier 36 has its anode 36, connected to a second terminal 32₂ of inductor 32, and its cathode 36₂ connected to an output terminal 42. A load, illustrated as a resistor 40, is connected between output voltage terminal 41 and reference terminal 24, where the word "between" is used in an electrical, rather than mechanical, sense. It should be noted that load 40 is not, strictly speaking, a part of the power supply 10, but is rather represents the device to be powered by the power supply 10, and its presence is necessary in order to explain the operation of the power supply.

With the connections as so far described, application of pulsating direct voltage to voltage input terminal 26 of FIG. 1 with buck switch 30ON or conductive allows current to flow between terminal 26 and reference terminal 24 by way of a path including buck switch 30, inductor 32, diode 36, and load 40. This current can flow only when the input voltage at terminal 26 exceeds the direct output voltage at terminal 42. A "free wheeling" unidirectional current conducting device 34, illustrated as a diode D1, has its cathode connected by way of a terminal 34₂ to the first input terminal 32, of inductor 32, and its anode connected by way of a terminal 34₁ to reference voltage terminal 24. When, during a time in which current flows in the path including buck switch 30, inductor 32, diode 36, and load 42, buck switch 30 is rendered nonconductive or OFF, diode 34 is rendered conductive by the "reaction" voltage or "inductive kick" of inductor 32, to provide a path for the continued flow of current through inductor 32. Thus, current flows through inductor 32 both when buck switch 30 is ON and also when it is OFF in the "buck" mode of operation. The current through inductor 32 and diode 36 flows, at least in part, through load resistance 40. An output filter capacitor (C2) 38 has a first terminal 38, connected to reference terminal 24 and a second terminal 382 connected to direct output voltage terminal 42, for averaging the current for filtering the load voltage.

Figure 2:
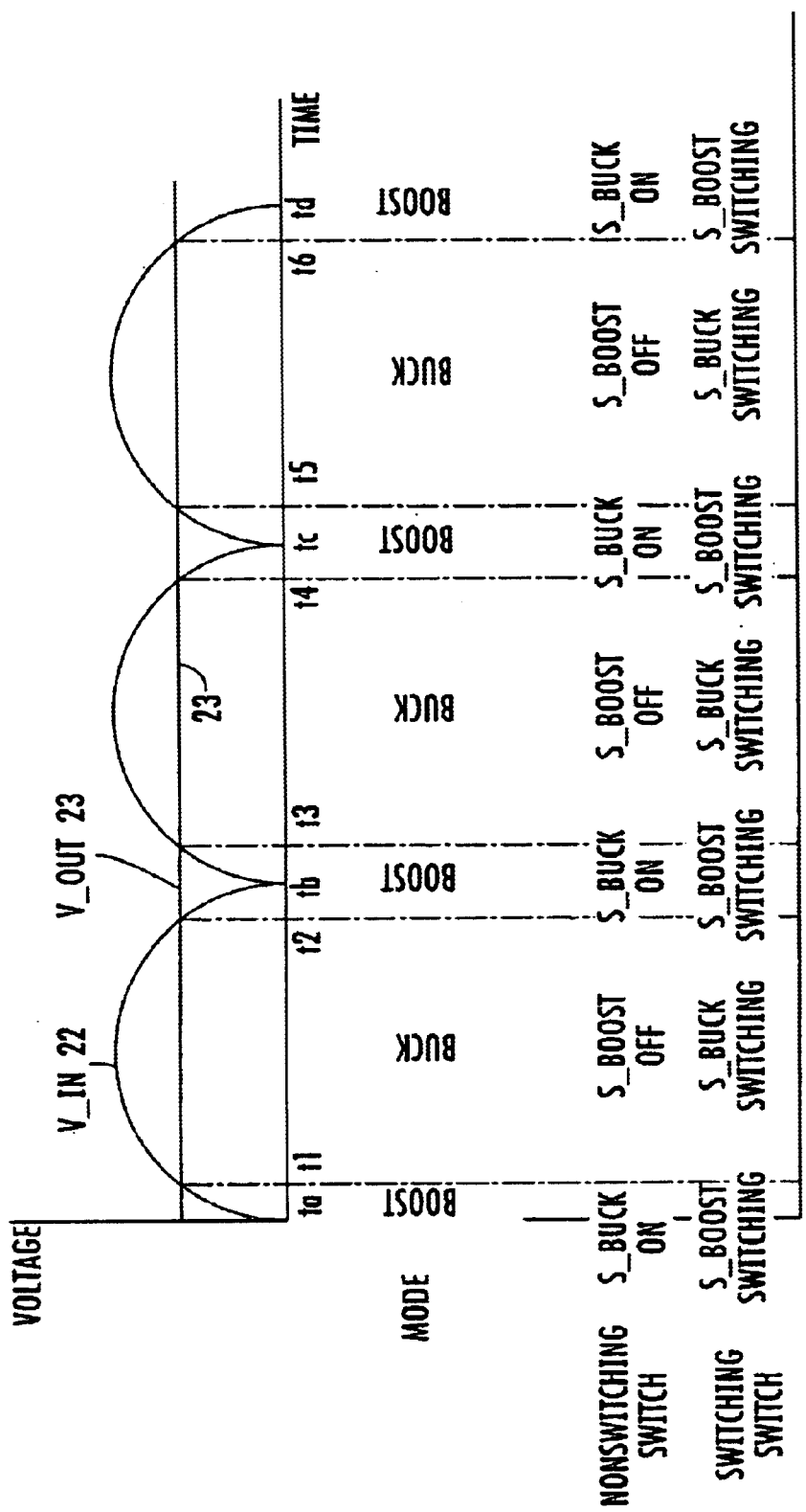
FIG. 2 is a simplified voltage-time diagram illustrating pulsating direct input voltage and direct output voltage, and also indicating the operating mode of the arrangement of FIG. 1 at various times during the operating cycle.

FIG. 1 also shows a further power switch (S_boost) 50 connected between the second terminal 322 of inductor 32 and reference terminal 24. During the buck mode of operation (in which input voltage at terminals 24, 26 is greater than output voltage at terminals 24, 42), switch 50 is maintained OFF or nonconductive. However, during those periods in which the pulsating input voltage at terminal 26 happens to have a value (relative to that at reference terminal 24) which is less than the direct output voltage at output terminal 42, operation in the buck mode cannot occur, at least in part because blocking diode 36 prevents the flow of current through inductor 32. During those intervals in which the input voltage at terminal 26 is less than the desired output voltage, buck switch 30 is rendered "continuously" conductive, and operation occurs in a "boost" operating mode. In boost operation, boost switch 50 is rendered conductive for a period of time, thereby providing a path for the flow of current through conductive buck switch 30 and inductor 32 to "ground" terminal 24, thereby providing for an increase of energy stored in inductor 32. At a selected time during each operating cycle, boost switch 50 is rendered nonconductive or turned OFF. At the moment that switch 50 becomes nonconductive, the reaction voltage of inductor 32 renders diode 34 conductive, thereby connecting terminal 32, of inductor 32 to reference terminal 24, whereby the reaction voltage at inductor terminal 322 becomes available for the load. More particularly, the reaction voltage at terminal 322 of inductor 32 is felt by load 40 through diode 36, and corresponding current flows for use by the load and for filtration by capacitor 38. Thus, current flows in the same direction through inductor 32 in both buck and boost modes, with the operating mode determined by whether the source 20 pulsating direct voltage at terminals 24/26 is greater or less, respectively, than the output direct voltage. In FIG. 2, the pulsating direct source voltage 22 exceeds the direct output voltage 23 during the intervals t1 to t2, t3 to t4, and t5 to t6, which corresponds with the "buck" mode indication. Similarly, the pulsating direct source voltage 22 as illustrated in FIG. 2 is less than the direct output voltage during the intervals ta to t1, t2 to t3, and t4 to t5, which corresponds with the "boost" indication. FIG. 2 also summarizes the states of the buck switch 30 and the boost switch 50 of FIG. 1, by indicating that during the boost intervals the buck switch S_buck is continuously ON (nonswitching), and the boost switch S_boost is alternated or switched between conducting and nonconducting states. Similarly, FIG. 2 indicates that during the buck intervals the boost switch S_boost is continuously OFF or nonconductive (nonswitching) and the buck switch S_buck is switched or alternated between conductive and nonconductive states.

Boost switch 50 of FIG. 1 is paralleled by a "soft switching" circuit 60 including the series combination of a saturable inductor (L3) and a boost soft switching (S_2) switch 64. In this context, the term "paralleled" is not used in its mechanical sense, but rather in an electrical sense, to the effect that the same voltage is felt across (in an electrical sense) both the boost switch 50 and the soft switching circuit 60. Soft switching switch 64 is controlled by control block 16a. Soft switching switch 64 is maintained nonconductive during the buck operating mode. During the boost operating mode, soft switching switch 64 is rendered conductive at a time during each operating cycle prior to the time at which boost switch 50 is rendered conductive.

The operation of soft switching circuit 60 of FIG. 1 is explained with the aid of the amplitude-time plots or illustrations of FIGS. 3a, 3b, 3c, 3d, 3e, 3f, and 3g. FIGS. 3a, 3b, 3c, 3d, 3e, 3f, and 3g are taken directly from the application notes for prior-art controller 16a. In operation, the boost operating mode will begin when the source voltage is slightly less than the direct output voltage. More particularly, FIG. 3a illustrates the boost switch 50 (S_boost) control (gate) voltage 310, with positive or "high" amplitude, representing an ON state of the boost switch, in the interval t3 to t5 of the illustrated time interval. FIG. 3b illustrates the control (gate) voltage 312 of soft-switching switch (S_2) 64 of FIG. 1. Soft-switching switch 64 is rendered conductive at a time ta, prior to time t3 at which boost switch (S_boost) 50 is rendered conductive, and is rendered nonconductive at time t3 concurrently with the rendering conductive of boost switch (S_boost) 50.

Prior to time ta of FIGS. 3a through 3g, the power supply 10 of FIG. 1 could have been operating in the buck mode, and current was flowing through inductor 32, maintaining diode 36 conductive with a current indicated by plot 322 of FIG. 3g. Since diode 36 is conductive prior to time ta, its voltage drop is essentially zero (actually one VBE), as illustrated by plot 320 of FIG. 3f. Prior to time ta of FIG. 3a, boost switch (S_boost) 50 is nonconductive, and it stands off a voltage equal to the output direct voltage V_out (minus one VBE), as indicated by plot 314 of FIG. 3c, and its current is zero, as indicated by plot 316 of FIG. 3d. Soft-switching switch (S_2) 64 of FIG. 1 is nonconductive prior to time ta of FIGS. 3a through 3g, as indicated by its control (gate) voltage 312 of FIG. 3b, and the current in saturable inductor 62 (L3) is also zero.

At time ta of FIGS. 3a through 3g, soft-switching switch (S_2) 64 is rendered conductive, as indicated by HIGH state of the control voltage 312 of FIG. 3b. With switch 64 conductive, the load voltage V_out is felt across saturable inductor 62 of FIG. 1. Saturable inductor 62 has high incremental impedance at low currents and low incremental impedance at high currents. Consequently, saturable inductor 62 initially presents a high impedance to the applied voltage, and the current in saturable inductor 62 is initially small at times immediately after time ta, as indicated by current L3 plot 318 of FIG. 3e. As time progresses or increases from time ta, the current in inductor 62 increases, and increasing saturation decreases the impedance presented by the inductor to the applied voltage. At time t1, the current L3 in saturable inductor 62 equals the current flowing through inductor (L2) 32, and the current available to flow through diode (D2) 36 becomes zero. Diode 36 becomes nonconductive at time t1. Current continues to increase in saturable inductor 62 of FIG. 1 after time t1, and eventually, at time t2 of FIG. 3e, the inductor becomes completely saturated, and presents essentially zero impedance to the applied current. Thus, beginning at time t2 of FIGS. 3a through 3g, the soft-switching circuit 60 of FIG. 1, including soft-switching switch 64 and saturable inductor 62, appears as a short-circuit across boost switch 50. With a short circuit across boost switch 50 of FIG. 1, the voltage across boost switch 50 decreases to zero volts, as illustrated by plot 314 of FIG. 3c. The voltage across diode 36 becomes equal to the output voltage V_out, as suggested by plot 320 of FIG. 3f in the interval t2 to t5. Since terminal 322 of inductor 32 is essentially grounded to terminal 24 by the soft switching circuit 60, current begins to flow through inductor 32, and increases with time. The current flow through inductor 32 near time t2 is approximated by current Iboost 316 of FIG. 3d.

At a time t3 later than time t2 of FIGS. 3a through 3g, when the voltage (Voltage S_boost) applied across boost switch 50 is low, boost switch 50 receives a control signal which turns it ON or renders it conductive, as suggested by plot 310 of FIG. 3a in the interval t3 through t5. Also at time t3, soft-switching switch 64 is turned OFF. Immediately following the time t3 at which boost switch 50 is rendered conductive, the combination of switch 50 and soft switching circuit 60 carries a "negative" current which is caused by reaction of saturable inductor 62 exceeding the current through inductor 32, as illustrated by Iboost current 316 of FIG. 3d. However, the current in inductor 32 rapidly rises, and conductive boost switch 50 of FIG. 1 carries an increasing current in the interval t3 to t4, as illustrated by plot 316 of FIG. 3d. Current continues to build up in inductor 32 of FIG. 1 in the time interval t3 through t4 of FIGS. 3a through 3g. In FIGS. 3a through 3g, the time interval t4 to t5 is illustrated as being greater than the actual time duration, to better illustrate the operation. While the current Iboost 316 of FIG. 3d is shown as limiting at a value $I_{in}$, this limiting will not occur if time t5 immediately follows time t4.

At time t5 of FIGS. 3a through 3g, sufficient energy has been stored in inductor 32 of FIG. 1, and the control signal represented by plot 310 of FIG. 3a turns boost switch 50 OFF. After time t5, a reaction voltage of inductor 32 results in a short-duration voltage change in the interval t5 to t6, which in turn causes a current to flow in diode (D2) 36 of FIG. 1 beginning at time t6, as suggested by plot 322 of FIG.

3g. The flow of current through diode 36 in the interval following time t6 reduces the diode voltage to zero, as suggested by plot 320 of FIG. 3f in the interval t5 to t6. The relative durations of the various intervals controls the output voltage V_out. For example, in the boost operating mode, holding boost switch (S_boost) 50 conductive for a relatively longer period allows more energy to be stored in inductor 32 and tends to increase the output voltage V_out. These durations can be controlled in a feedback manner. Thus, boost switch 50 of FIG. 1 becomes conductive at a time t3, at a time at which the applied voltage is zero or near-zero. This avoids undesirable heating effects which arise from delays in becoming conductive with voltage applied.

FIG. 1 also illustrates a soft-switching circuit 70 according to an aspect of the invention, which includes the series combination of a saturable inductor 72 and a soft-switching switch 74. Soft-switching circuit 70 is connected in parallel (in an electrical sense of the word) with buck switch 30.

In the buck mode of operation, in which the input voltage applied to input terminal 26 of FIG. 1 is greater than the output voltage at terminal 42, the conditions prior to time t2 of FIGS. 4a through 4h include nonconduction of S-boost switch 50 and soft-switching switch S_2 64 during any portion of the operating cycle. Immediately prior to time t0 of FIGS. 4a through 4h, buck switch S_buck 30 and soft switch S1 74 are nonconductive, and current is supplied to the load 40 and capacitor 38 by discharge of energy of inductor L2 32 through diodes 34 and 36, as indicated by L2 current 424 prior to time t0. Since soft switch 74 is nonconductive, no current flows in soft switching inductor 72, and its incremental impedance is high. Soft-switching switch (S1) 74 of FIG. 1 is controlled by a portion 16b of controller 16, which interacts with the various timing signals to control switch 74.

At time t0 of FIGS. 4a through 4h, the soft switching circuit 70 switch (S1) 74 of FIG. 1 is controlled, according to an aspect of the invention, from soft-switching controller 16b by a control signal, illustrated in FIG. 4a as a gate voltage 410, which control signal is applied at a time designated t0 to render soft switching switch S1 conductive, and the voltage across soft-switching switch S1 74 decreases, as illustrated in the interval to t1 by waveform 414 of FIG. 4c. Since the applied input voltage exceeds the output voltage in the buck mode, the conduction of soft switch 74 causes current to begin to flow through soft switching inductor 72, inductor 32, diode 36, and the parallel combination of capacitor 38 and load 40, as suggested by the increase in the current L1 illustrated as plot 422 of FIG. 4g. Inductor L1 72 of FIG. 1 is small, and saturates easily. Immediately after time t0, it is saturated, and presents a small inductance. The small inductance of saturable inductor 72 in its saturated state resonates with the inherent capacitance 30c of buck switch 30 of FIG. 1, to produce a half-cycle sine wave of current, as illustrated in the interval t0 to t1 of plot 422 of FIG. 4g. The resonance proceeds for about one-half cycle, until a time near time t1. The resonant voltage applied to the inherent capacitance of buck switch 30 near time t1 is opposite in phase to the applied voltage from terminal 26, and substantially equal in amplitude. Consequently, the voltage across buck switch 30 decreases with time as illustrated by voltage 416 of FIG. 4d, and becomes zero near time t1.

At time t1 at which the voltage across buck switch 30 of FIG. 1 is near zero, due to the resonance of saturable inductor 72 with the inherent capacitance of buck switch 30, S-buck switch 30 is rendered conductive by an applied control or gate voltage, illustrated as plot 412 of FIG. 4b. Thus, buck switch 30 is turned ON at a time during which the voltage thereacross is near zero. With buck switch 30 conductive, the voltage across saturable inductor 72 becomes zero, and its current drops, as illustrated by plot 422 of FIG. 4g near time t1.

After time t1, an increasing current flows through buck switch 30 of FIG. 1, as illustrated by plot 418 of FIG. 4e. This increasing current flows through inductor 32, and results in increasing energy storage in the inductor. Energy storage in inductor 32 of FIG. 1 increases until a later time t2, at which time S_buck switch 30 is rendered nonconductive by control or gate voltage 412 of FIG. 4b. At time t2, the reaction voltage of inductor 32 causes free-wheeling diode D1 to become conductive, as illustrated by plot 420 of FIG. 4f. Following time t2, the energy stored in inductor 32 is transferred to the load 40, and a concomitant decrease in current occurs in inductor 32.

According to an aspect of the invention, a buck-boost power factor correcting supply (10) generates a direct output voltage (V_out) for energizing a load (40), and operates from (or is energized by) full-wave rectified line voltage (22) which takes on voltage values both greater than and less than the direct output voltage (V_out). The supply (10) comprises a first inductor (32) including first ($32_1$) and second ($32_2$) terminals. A buck switch (30) is connected to a terminal (26) of the source (20) of full-wave rectified line voltage (22) and to the first (321) terminal of the first inductor (32). An output capacitance (38), which may be associated with a capacitor, includes a first terminal ($38_1$) connected to a reference potential (24) and also includes a second terminal ($38_2$) at which the direct output voltage (V_out) is generated for use by the load (40). A free-wheeling unidirectional current conducting means or arrangement (34), such as a diode or rectifier, includes a first terminal ($34_1$) connected to the reference potential (24) and a second terminal ($34_2$) connected to the first terminal ($32_1$) of the first inductor (32), for providing a path for the flow of current through the first inductor (32) during at least some intervals during which the buck switch (30) is nonconductive. The buck-boost power factor correcting supply (10) includes blocking unidirectional current conducting means or arrangement (36), such as a diode or rectifier, including a first terminal ($36_1$) connected to the second terminal ($32_2$) of the first inductor (32) and a second terminal ($36_2$) connected to the second terminal ($38_2$) of the output capacitance (38), and poled for blocking discharge of the output capacitance (38) in a direction other than to the load (40). A boost switch (50) connected to the second terminal ($32_2$) of the first inductor (32) and to the reference potential (24), for, during at least some intervals in which the buck switch (30) is conductive, connecting the second terminal ($32_2$) of the first inductor (32) to the reference potential (24) for increasing the energy stored in the first inductor (32). A first soft-switching circuit (60) includes the serial combination of a first soft-switching switch (64) and a saturable second inductor (64). The first soft-switching circuit (60) is coupled in parallel with the boost switch (50). A second soft-switching circuit (70) includes the serial combination of a second soft-switching switch (74) and a saturable third inductor (72). The second soft-switching circuit (70) is connected in parallel with the buck switch (30). A control means or arrangement (16) is connected to the buck switch (30), the boost switch (50), and to the first (64) and second (74) soft-switching switches, for, (a) when the full-wave rectified line voltage (22) is less than the direct output voltage (V_out), maintaining the buck switch (30)

conductive, and from time to time rendering the boost switch alternately conductive and nonconductive, and, prior to the transitions of the boost switch from the nonconductive to the conductive state, rendering the first soft switching switch conductive, whereby the first soft switching circuit reduces the voltage appearing across the boost switch at the time the boost switch is rendered conductive by comparison with the voltage appearing across the boost switch in the absence of the first soft switching circuit, and (b) when the full-wave rectified line voltage is greater than the direct output voltage, maintaining the boost switch (50) and the first soft switching switch (64) nonconductive, and from time to time rendering the buck switch (30) alternately conductive and nonconductive, and, prior to transitions of the buck switch (30) from the nonconductive to the conductive state, rendering the second soft switching switch (74) conductive, whereby the second soft switching circuit (70) reduces the voltage appearing across the buck switch (30) at the time the buck switch (30) is rendered conductive by comparison with the voltage appearing across the buck switch (30) in the absence of the second soft switching circuit (70).

In a particularly advantageous embodiment of the invention, the buck switch (30) is a solid-state switch exhibiting inherent capacitance, and the second soft switching switch (74) is rendered conductive at a time sufficiently prior to the rendering conductive of the buck switch (30) so that one-half cycle of resonance can occur between the saturable third inductor (72) and the capacitance (30*c*) inherent in the solid-state buck switch (30).

What is claimed is:

1. A buck-boost power factor correcting supply for generating a direct output voltage for energizing a load, and for operation from full-wave rectified line voltage which takes on voltage values both greater than and less than said direct output voltage, said supply comprising:

a first inductor including first and second terminals;

a buck switch connected to a terminal of said source of full-wave rectified line voltage and to said first terminal of said first inductor;

an output capacitance including a first terminal connected to a reference potential and also including a second terminal at which said direct output voltage is generated for use by said load;

free-wheeling unidirectional current conducting means including a first terminal connected to said reference potential and a second terminal connected to said first terminal of said first inductor, for providing a path for the flow of current through said first inductor during at least some intervals during which said buck switch is nonconductive;

blocking unidirectional current conducting means including a first terminal connected to said second terminal of said first inductor and a second terminal connected to said second terminal of said output capacitance, and poled for blocking discharge of said output capacitance in a direction other than to said load;

a boost switch connected to said second terminal of said first inductor and to said reference potential, for, during at least some intervals in which said buck switch is conductive, connecting said second terminal of said first inductor to said reference potential for increasing the energy stored in said first inductor;

a first soft-switching circuit including the serial combination of a first soft-switching switch and a saturable second inductor, said first soft-switching circuit being coupled in parallel with said boost switch;

a second soft-switching circuit including the serial combination of a second soft-switching switch and a saturable third inductor, said second soft-switching circuit being connected in parallel with said buck switch; and control means connected to said buck switch, said boost switch, and to said first and second soft-switching switches, for, (a) when said full-wave rectified line voltage is less than said direct output voltage, maintaining said buck switch conductive, and from time to time rendering said boost switch alternately conductive and nonconductive, and, during transitions of said boost switch from the nonconductive to the conductive state, rendering said first soft switching switch conductive prior to the rendering of said boost switch conductive, whereby said first soft switching circuit reduces the voltage appearing across said boost switch at the time said boost switch is rendered conductive by comparison with the voltage appearing across said boost switch in the absence of said first soft switching circuit, and (b) when said full-wave rectified line voltage is greater than said direct output voltage, maintaining said boost switch and said first soft switching switch nonconductive, and from time to time rendering said buck switch alternately conductive and nonconductive, and, during transitions of said buck switch from the nonconductive to the conductive state, rendering said second soft switching switch conductive prior to the rendering of said buck switch conductive, whereby said second soft switching circuit reduces the voltage appearing across said buck switch at the time said buck switch is rendered conductive by comparison with the voltage appearing across said buck switch in the absence of said second soft switching circuit.

2. A buck-boost power factor correcting supply for generating a direct output voltage for energizing a load, and for operation from full-wave rectified line voltage which takes on voltage values both greater than and less than said direct output voltage, said supply comprising:

a first inductor including first and second terminals;

a solid-state buck switch connected to a terminal of said source of full-wave rectified line voltage and to said first terminal of said first inductor, said solid-state buck switch exhibiting inherent capacitance;

an output capacitance including a first terminal connected to a reference potential and also including a second terminal at which said direct output voltage is generated for use by said load;

free-wheeling unidirectional current conducting means including a first terminal connected to said reference potential and a second terminal connected to said first terminal of said first inductor, for providing a path for the flow of current through said first inductor during at least some intervals during which said buck switch is nonconductive;

blocking unidirectional current conducting means including a first terminal connected to said second terminal of said first inductor and a second terminal connected to said second terminal of said output capacitance, and poled for blocking discharge of said output capacitance in a direction other than to said load;

a boost switch connected to said second terminal of said first inductor and to said reference potential, for, during at least some intervals in which said buck switch is conductive, connecting said second terminal of said first inductor to said reference potential for increasing the energy stored in said first inductor;

a first soft-switching circuit including the serial combination of a first soft-switching switch and a saturable second inductor, said first soft-switching circuit being coupled in parallel with said boost switch;

a second soft-switching circuit including the serial combination of a second soft-switching switch and a saturable third inductor, said second soft-switching circuit being connected in parallel with said buck switch; and control means connected to said buck switch, said boost switch, and to said first and second soft-switching switches, for, (a) when said full-wave rectified line voltage is less than said direct output voltage ($V\_out$), maintaining said buck switch conductive, and from time to time rendering said boost switch alternately conductive and nonconductive, and, during transitions of said boost switch from the nonconductive to the conductive state, rendering said first soft switching switch conductive prior to the rendering conductive of said boost switch, whereby said first soft switching circuit reduces the voltage appearing across said boost switch at the time that said boost switch is rendered conductive by comparison with the voltage appearing across said boost switch in the absence of said first soft switching circuit, and (b) when said full-wave rectified line voltage is greater than said direct output voltage, maintaining said boost switch and said first soft switching switch nonconductive, and from time to time rendering said buck switch alternately conductive and nonconductive, and, in conjunction with transitions of said buck switch from the nonconductive to the conductive state, rendering said second soft switching switch conductive at a time sufficiently prior to the rendering of said buck switch conductive to result in one-half cycle of resonance of said saturable third inductor with said capacitance of said buck switch, whereby said second soft switching circuit reduces the voltage appearing across said buck switch at the time said buck switch is rendered conductive by comparison with the voltage appearing across said buck switch in the absence of said second soft switching circuit and said half-cycle of resonance.

\* \* \* \* \*